T. C. Hargrave.
Water Meter.
N° 90,662.
Patented Jan. 1, 1869
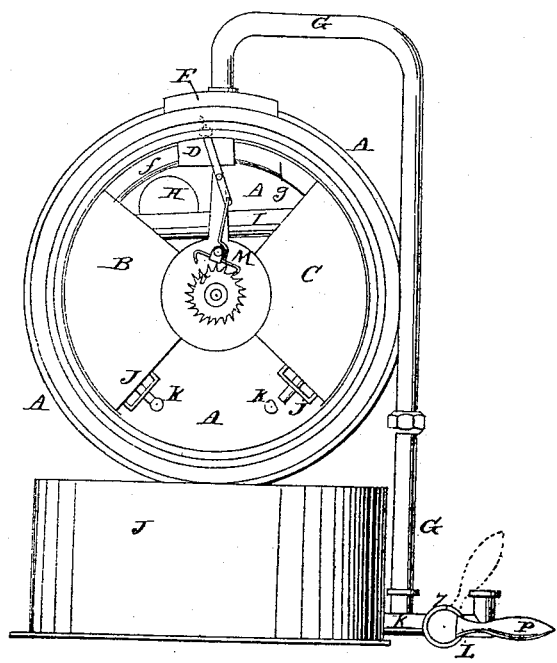
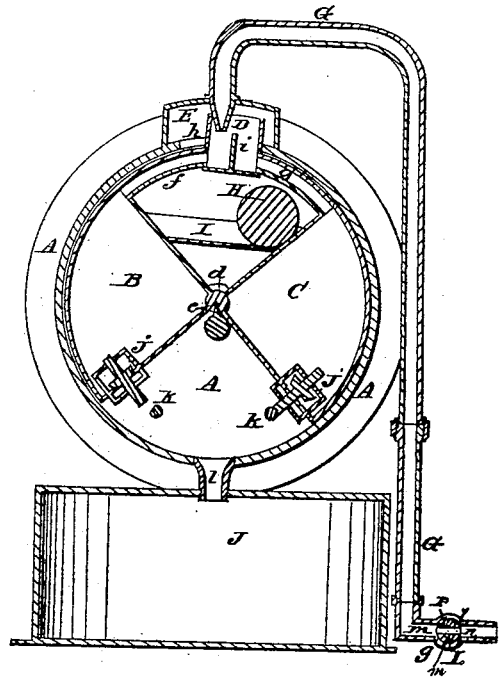
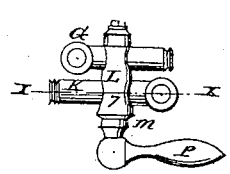
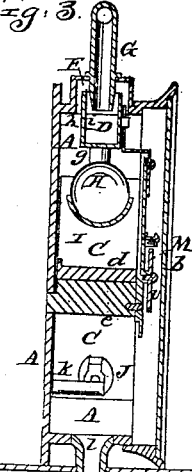
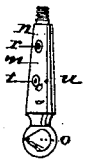
Witnesses:
Inventor:
T. C. Hargrave

United States Patent Office.

THOMAS C. HARGRAVE, OF BOSTON, MASSACHUSETTS.

Letters Patent No. 90,662, dated June 1, 1869.

IMPROVEMENT IN WATER-METERS.

The Schedule referred to in these Letters Patent and making part of the same.

*To all whom it may concern:*

Be it known that I, THOMAS C. HARGRAVE, of Boston, in the county of Suffolk, and State of Massachusetts, have invented certain new and useful Improvements in Meters for Measuring the Flow of Water or other Liquids, of which the following is a full, clear, and exact description, reference being had to the accompanying drawings, making part of this specification, in which—

Figure 1 is a front elevation of my improved meter.

Figure 2 is a longitudinal vertical section through the centre of the same.

Figure 3 is a transverse vertical section through the centre of the same.

Figure 4 is a plan of the stop-cock which I employ.

Figure 5 is a section on the line $x\,x$ of fig. 4.

Figure 6, detail to be referred to.

This invention has for its object to produce a cheap, simple, and durable meter which will accurately measure and register the quantity of water or other liquid passing through it, and which at the same time will not reduce the pressure of head of the water, but will allow it to rise in the delivery-pipes as high and with the same force as if no meter were employed; and my invention consists in two oscillating measuring-chambers connected together and accurately balanced upon a knife-edge, or its equivalent, within an air-tight casing, in combination with a shifting counterbalance-weight which moves on a suitable guide-way from one side to the other, and a device for alternately admitting the water or other liquid to the measuring-chambers, which are provided at or near their lowest points with valves, which are opened by the oscillation of the chambers, to allow the liquid to escape into the lower portion of the casing, from which it passes, either into an air-chamber beneath, or directly to the point from which it is to be drawn for use.

To enable others skilled in the art to understand and use my invention, I will proceed to describe the manner in which I have carried it out.

In the said drawings—

A represents the outer casing, which is air-tight, and is of circular or other suitable form, its front, which is provided with a glass plate, $b$, being made removable so as to afford access to the interior.

Within the casing A are arranged two measuring-chambers, B C, of equal size and weight, which are connected together at $d$, and rest at this point upon a knife-edge, $e$, projecting from the rear plate of the casing A, in a manner similar to a scale-beam, so that they will rock or oscillate freely from side to side, without creating any appreciable friction.

$f\,g$ are two pipes through which the water or other liquid enters the measuring-chambers, these pipes being connected with a box or receptacle, D, which is centrally placed between the chambers B C, its upper portion extending through an opening, $h$, in the casing A, into a chamber, E, above.

G is the inlet-pipe through which the supply of water or other liquid is received, the end of this pipe, which is flattened so as to form a long narrow discharge-opening, passing through the top of the chamber E, and extending a short distance into the box D, which is provided with a partition, $i$, extending entirely across it, so that when the measuring-chambers are in the position seen in fig. 1, the liquid will pass through the pipe $g$, into the chamber C, and when the chambers are oscillated into the position seen in fig. 2, the liquid will pass through the pipe $f$ into the chamber B, the chambers being thus alternately filled as required. The amount of oscillation of the measuring-chambers B C, is limited by the contact of the box D with the ends of the opening $h$ at the top of the casing A.

H is a shifting counterbalance-weight, of spherical form, which is supported in a trough or guide-way, I, the weight rolling freely from one side to the other of this way, as the chambers oscillate. The trough or way I may, if desired, be slightly curved, so as to be lower at the centre than at the ends, which will cause the ball or weight H to start quicker than if the way were perfectly straight, as shown in the drawings.

Each of the measuring-chambers B C is provided at or near its lowest point with a check-valve, $j$, which is thrown open by its stem coming into contact with a pin or stop, $k$, as the chamber is carried down by the weight of the water which it contains, and the movement of the shifting counterbalance H, the opening of the valve allowing the water to escape freely from the chamber into the lower portion of the casing A, from which it passes through an opening, $l$, into the air-chamber J, at or near the bottom of which is the outlet K, through which the liquid passes to the delivery-pipes. The size of the valves $j$ is such that the liquid will escape faster than it enters, which thus insures one chamber being entirely empty before the other is filled to such a height as to produce the oscillation. The air-chamber J serves as a reservoir, and as the casing A is made air-tight, the introduction of water under pressure into the chamber J, compresses the air contained therein until its pressure equals that induced by the head of water from which the supply is derived and consequently the pressure of the water is not reduced by its passage through the meter, while the relative sizes of the air-chamber J and the casing A, which contains the mechanism, are such that a pressure upon the air, corresponding to the pressure produced by the head of water, will be attained before the water can rise from the air-chamber J into the air-tight casing A, and the mechanism contained therein is consequently kept comparatively dry as required. By the employment of the air-chamber J, I am enabled to place my improved meter in the cellar of a building, or at any other point between the inlet and the point of delivery, as it allows the water to rise in the delivery-pipes as high and with as much force as if no meter were employed. Where, however, it is desired to apply the meter above the point from which the water is to be drawn, for instance, to a single faucet, the air-chamber J may be dispensed with, the casing A, with its mechanism, only being employed, in which case the opening $l$ will form the outlet for the water, as no pressure would be required within the casing A.

The inlet-pipe G, and the outlet-pipe K, are both connected with the shell 7, of a stop-cock, L, the plug $m$ of which is provided with two openings $n$ $o$, which are both brought, by a single movement of the handle $p$, into a position to allow the water to pass freely through the inlet and outlet-pipes. When, however, the handle $p$ is turned into the position seen in red, in fig. 1, to shut off the water, the opening $n$ is brought opposite to a small opening, $q$, in the shell 7, and an opening, $r$, in the plug, communicating with the opening $n$, is brought opposite to the pipe G, which is thus emptied as required. At the same time the opening $o$ is brought opposite to a small opening, $s$, fig. 5, in the shell 7, and an opening, $t$, in the plug $m$, is brought into line with the pipe K, which allows the water in this pipe, and in the air-chamber J, to escape through the openings $t$ $o$ $s$, while another opening, $u$, in the plug, $m$, is brought into line with that portion of the delivery-pipe beyond the stop-cock, which will thus be emptied through the openings $u$ $o$ $s$.

It will thus be seen that no other stop-cock is required except the one above described, which is attached to the meter, as it answers for both inlet and outlet-pipes; consequently the necessity of two separate stop-cocks, as heretofore required, is avoided, while the inlet and outlet-pipes being brought near together, the attachment of the apparatus is much facilitated; and a stop-cock constructed, as above described, is therefore particularly applicable to meters.

M is the registering-apparatus, consisting of an ordinary clock-escapement, which is so connected with the measuring-chambers that each oscillation thereof will cause the wheel $v$ to be moved forward a certain distance, so as to register the number of oscillations and consequently the quantity of liquid which passes through the meter. Any other suitable registering-apparatus may, however, be employed, if desired.

The operation of my improved meter is as follows:

The parts being in the position seen in fig. 1, the water or other liquid passes from the mouth of the inlet or supply-pipe G, into the box D, from which it passes through the pipe $g$, into the measuring-chamber C, the liquid in the chamber B being at the same time discharged through its valve $j$ into the lower portion of the air-tight casing A, whence it passes into the air-chamber J, and thence into the delivery-pipes As soon as the weight of the liquid in the chamber C exceeds that of the counterbalance H, the measuring-chambers are oscillated upon the knife-edge $e$, causing the counterbalance H to roll over to the opposite side adjacent to the chamber C, which is thus held down, not only by the weight of the liquid which it contains, but also by the additional weight of the counterbalance H.

This oscillation of the measuring-chambers brings the opposite side of the box D beneath the inlet-pipe G, when the liquid will pass through the pipe $f$ into the chamber B, that contained in the chamber C being at the same time discharged through its valve $j$.

The chambers are again oscillated as soon as the weight of the liquid in the chamber B exceeds that of the counterbalance H, and the operation continues as before.

It will be seen that the shifting counterbalance H not only prevents the measuring-chambers from oscillating until the one being discharged is entirely empty, but until a quantity of liquid equal in weight to that of the counterbalance has entered the opposite chamber; and as these chambers are nicely balanced upon a knife-edge, so as to avoid friction, it is evident that the quantity of liquid which enters each chamber will be accurately weighed or measured by the counterbalance H, causing the meter to work with certainty and regularity, and accurately measure the quantity of water or other liquid passing through it.

I do not confine myself to the particular form or arrangement of the counterbalance H, as it may be constructed and applied in a variety of ways, so as to move from one side to the other as the chambers oscillate.

Instead of the measuring-chambers being hung upon a knife-edge as above described, they may be made to oscillate upon axles or centres, without departing from the spirit of my invention. I prefer, however, to employ a knife-edge, as it reduces the friction to a minimum.

If preferred, the parts may be so constructed as to allow the water to be admitted from the inlet-pipe G directly to the measuring-chambers without the interposition of the pipes $f$ $g$.

Claims.

What I claim as my invention, and desire to secure by Letters Patent, is—

The oscillating measuring-chambers B C, balanced upon a knife-edge, $e$, or its equivalent, within a casing, A, in combination with a rolling or sliding counterbalance-weight H, and the pipes $f$ $g$, partitioned box D, and inlet-pipe G, or equivalent device for admitting the liquid alternately to the measuring-chambers, substantially as described.

Also, the air-chamber J, in combination with an air-tight casing, A, and the mechanism contained therein, as above recited, and the inlet and outlet-pipes G K, operating substantially in the manner and for the purpose set forth.

T. C. HARGRAVE.

Witnesses:
P. E. TESCHEMACHER,
W. J. CAMBRIDGE.